US006888952B2

(12) United States Patent
Venkatesan et al.

(10) Patent No.: US 6,888,952 B2
(45) Date of Patent: May 3, 2005

(54) ROBUST AND STEALTHY VIDEO WATERMARKING

(75) Inventors: Ramarathnam Venkatesan, Redmond, WA (US); M. Kivanc Mihcak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/880,178

(22) Filed: Jun. 29, 2004

(65) Prior Publication Data

US 2004/0234099 A1 Nov. 25, 2004

Related U.S. Application Data

(63) Continuation of application No. 09/843,287, filed on Apr. 24, 2001.

(51) Int. Cl.$^7$ .............................. G06K 9/46; H04K 1/00
(52) U.S. Cl. ....................................... 382/100; 348/465
(58) Field of Search ................................ 382/100, 217, 382/218, 305; 380/210, 287; 713/176; 707/2, 3, 6; 725/20, 22; 348/465

(56) References Cited

U.S. PATENT DOCUMENTS

| 4,773,039 A | 9/1988 | Zamora ....................... 364/900 |
| 5,351,310 A | 9/1994 | Califano et al. .............. 382/22 |
| 5,465,353 A | 11/1995 | Hull et al. ................... 395/600 |
| 5,613,004 A | 3/1997 | Cooperman et al. .......... 380/28 |
| 5,664,016 A | 9/1997 | Preneel et al. ................ 380/28 |

(Continued)

FOREIGN PATENT DOCUMENTS

| EP | 058117 A2 | 2/1994 | ............ G07D/7/00 |
| EP | 1 253 784 A2 | 10/2002 | ............ H04N/7/00 |
| WO | WO 99/17537 A1 | 4/1999 | ............ H04N/1/32 |
| WO | WO 99/18723 A1 | 4/1999 | .......... H04N/5/913 |
| WO | WO 99/60514 A1 | 11/1999 | ............ G06K/9/00 |
| WO | WO 01/11890 A1 | 2/2001 | ............ H04N/7/26 |
| WO | WO 01/28230 A1 | 4/2001 | ............ H04N/1/37 |
| WO | WO 02/37331 A1 | 5/2002 | .......... G06F/17/30 |

OTHER PUBLICATIONS

Mihçak et al., "Watermarking via Optimization Algorithms for Quantizing Randomized Statistics of Image Regions" *Proceedings of the Annual Allerton Conference on Communication Control and Computing*, Urbana, IL, 2002, 10 pages.

Moulin et al., "The Parallel–Gaussian Watermarking Game" *IEEE Transactions Information Theory*, Feb. 2004, pp. 1–36.

Venkatesan et al., "Robust Image Hashing" *Proceedings of the IEEE–ICIP*, Vancouver, BC, Canada, 2000, 3 pages.

(Continued)

*Primary Examiner*—Andrew W. Johns
(74) *Attorney, Agent, or Firm*—Lee & Hayes, PLLC (57) ABSTRACT

An implementation of a technology is described herein for the protection of rights in the content of a video sequence. This technology further generally relates to a technology facilitating embedding imperceptible, de-synchronization-resistant watermarks in video sequence and facilitating detecting such watermarks. These watermarks are resistant against unintentional and intentional modifications. In particular, the watermarks are resistant to de-synchronization. In addition, the watermarks are perceptually invisible. The watermarks are hidden in the video so that flicker is minimized or eliminated. More specifically, this technology hides a watermark (of portions thereof) over one or more regions of successive frames. Each region has a center defined by a hash value. A watermark (of portions thereof) is encoded into the region in a "plateau" manner. The mark (of portions thereof) is fully encoded in the frames surrounding the region's center, but trail off towards the edges of the region. This abstract itself is not intended to limit the scope of this patent. The scope of the present invention is pointed out in the appending claims.

9 Claims, 5 Drawing Sheets

U.S. PATENT DOCUMENTS

| | | | | |
|---|---|---|---|---|
| 5,687,236 | A | 11/1997 | Moskowitz et al. | 380/28 |
| 5,689,639 | A | 11/1997 | Schwarz | 395/200.01 |
| 5,774,588 | A | 6/1998 | Li | 382/230 |
| 5,809,498 | A | 9/1998 | Lopresti et al. | 707/6 |
| 5,875,264 | A | 2/1999 | Carlstrom | 382/181 |
| 5,953,451 | A | 9/1999 | Syeda-Mahmood | 382/187 |
| 6,081,893 | A | 6/2000 | Grawrock et al. | 713/183 |
| 6,101,602 | A | 8/2000 | Fridrich | 713/176 |
| 6,314,192 | B1 | 11/2001 | Chen et al. | 382/100 |
| 6,321,232 | B1 | 11/2001 | Syeda-Mahmood | 707/104 |
| 6,363,463 | B1 | 3/2002 | Mattison | 711/164 |
| 6,370,272 | B1 | 4/2002 | Shimizu | 382/232 |
| 6,700,989 | B1 | 3/2004 | Itoh et al. | 382/100 |
| 6,701,014 | B1 * | 3/2004 | Syeda-Mahmood | 382/199 |

OTHER PUBLICATIONS

Chang et al., "RIME: A Replicated Image Detector for the World–Wide Web" *Proceedings of the SPIE vol. 3527*, Nov. 2–4, 1998, pp. 58–67.

Chen et al., "Quantization Index Modulation Methods for Digital Watermarking and Information Embedding of Multimedia" *Journal of VLSI Signal Processing*, 27, 2001, pp. 7–33.

Mihçak et al., "New Iterative Geometric Methods for Robust Perceptual Image Hashing" *Proceedings of the Security and Privacy Digital Rights Management Workshop*, 2001, 9 pages.

Kesal et al., "Iteratively Decodable Codes for Watermarking Applications" *Proceedings of the Second Symposium on Turbo Codes and Their Applications*, France, Sep. 2000, 4 pages.

Venkatesan et al., "Image Watermarking with Better Resilience" *Proceedings of IEEE–ICIP*, Vancouver, BC, Canada, 2000, 4 pages.

Mihçak et al., "Cryptanalysis and Discrete–Sequence Spread Spectrum Watermarks" *Proceedings of the Information Hiding Workshop*, Holland, 2002, 21 pages.

Mihçak et al., "Blind Image Watermarking Via Derivation and Quantization of Robust Semi–Global Statistics" *Proceedings of IEEE–ICASSP*, Orlando, FL, 2002, 4 pages.

Chen et al., "Achievable Performance of Digital Watermarking Systems" IEEE, 1999, pp. 13–18.

Mihçak et al., "A Perceptual Audio Hashing Algorithm: A Tool For Robust Audio Identification and Information Hiding" *Proceedings of the Information Hiding Workshop*, 2001, 15 pages.

Malvar, "A Modulated Complex Lapped Transform and its Applications to Audio Processing" *IEEE ICASSP'99*, Phoenix, AZ, Mar. 1999, pp. 1–4.

Moulin et al., "A Framework for Evaluating the Data–Hiding Capacity of Image Sources" IEEE Transactions on Image Processing vol. 11 No. 9 Sep. 2002 pp. 1–14.

Wu et al., Video Access Control Via Multi–Level Data Hiding *Proc. IEEE Int. Conf. on Multimedia and Expo*, vol. I, Jul./Aug. 2000, pp 381–384.

Fridrich et al., "Robust Hash Functions for Digital Watermarking" *Proc. Int. Conf. on Information Technology: Coding and Computing*, Mar. 2000, pp 178–183.

Lee et al., "Adaptive Video Watermarking Using Motion Information" *Proc SPIE vol. 3971: Security and Watermarking of Multimedia Contents II*, Jan. 2000, pp. 209–216.

Echizen et al., "General Quality Maintenance Module for Motion Picture Watermarking" *IEEE Trans. on Consumer Electronics*, vol. 45, No. 4, Nov. 1999, pp 1150–1158.

* cited by examiner

ROBUST AND STEALTHY VIDEO WATERMARKING

RELATED APPLICATIONS

This application is a continuation of and claims priority to U.S. patent application Ser. No. 09/843,287, filed Apr. 24, 2001, the disclosure of which is incorporated by reference herein.

TECHNICAL FIELD

This invention generally relates to a technology facilitating the protection of rights in the content of a video sequence. This invention further generally relates to a technology facilitating embedding imperceptible, de-synchronization-resistant watermarks in video sequence and facilitating detecting such watermarks.

BACKGROUND

A "video sequence" is a series of images that typically capture (or simulate) motion, life, action, movement, etc. The video sequences are typically accompanied by audio. Watermarking a video sequence presents a series of significant challenges that are greater than those faced when watermarking other "digital goods."

"Digital goods" is a generic label for electronically stored or transmitted content. Examples of digital videos include images, audio clips, video, digital film, multimedia, software, and data.

A video sequence is a specific type of digital videos. It may also be called a "digital video," "video signal," "video bitstream," "video stream," "streaming video," "video media," "video object," "video," "digital film," "digital movie," and the like. The emerging field of "digital film" is a high-quality form of video.

Digital videos are often distributed to consumers over private and public networks—such as Intranets and the Internet. In particular, they may be "broadcast" via streaming video of a live or recorded event. In addition, these videos are distributed to consumers via fixed computer readable media, such as a compact disc (CD-ROM), digital versatile disc (DVD), soft magnetic tape, soft magnetic diskette, or hard magnetic disk (e.g., a preloaded hard drive).

Digital videos maybe stored in one or many different formats. Some of the more common multimedia file formats include: MPEG, Video of Windows®, QuickTime™, RealVideo™, Shockwave™, and the like.

Unfortunately, it is relatively easy for a person to pirate the pristine digital content of a digital video at the expense and harm of the content owners. Content owners include the content author, artist, publisher, developer, distributor, etc. The content-based industries (e.g., entertainment, music, film, television, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

Watermarking

Watermarking is one of the most promising techniques for protecting the content owner's rights of a digital video. Generally, watermarking is a process of altering the digital video such that its perceptual characteristics are preserved. More specifically, a "digital watermark" (or simply "watermark") is a pattern of bits inserted into a digital video that may be used to identify the content owners and/or the protected rights.

Watermarks are designed to be completely invisible or, more precisely, to be imperceptible to humans and statistical analysis tools. Ideally, a watermarked video signal is perceptually identical to the original video signal.

A watermark embedder (i.e., encoder) embeds a watermark into a digital video. It typically uses a secret key to embed the watermark. A watermark detector (i.e., decoder) extracts the watermark from the watermarked digital video.

To detect the watermark, some watermarking techniques require access to the original unmarked digital video or to a pristine specimen of the marked digital video. Some, watermarking techniques are "blind." This means that they do not require access to the original unmarked digital video or to a pristine specimen of the marked digital video. Of course, these "blind" watermarking techniques are desirable when the watermark detector is publicly available.

Before detection, a watermarked signal may undergo many possible changes by users and by the distribution environment. These changes may include unintentional modifications, such as noise and distortions. Moreover, the marked signal is often the subject of malicious attacks particularly aimed at disabling the detection of the watermark.

Ideally, a watermarking technique should embed detectible watermarks that resist modifications and attacks as long as they result in signals that are of perceptually the same quality. A watermarking technique that is resistant to modifications and attacks may be called "robust." Aspects of such techniques are called "robust" if they encourage such resistance.

Generally speaking, a watermarking system should be robust enough to handle unintentional noise introduction into the signal (such noise my be introduced by A/D and D/A conversions, compressions/decompressions, data corruption during transmission, etc.)

Furthermore, a watermarking system should be robust enough and stealthy enough to avoid purposeful and malicious detection, alternation, and/or deletion of the watermark. Such attack may use a "shotgun" approach where no specific watermark is known or detected (but is assumed to exist) or may use "sharp-shooter" approach where the specific watermark is attacked.

Those of ordinary skill in the art are familiar with conventional techniques and technology associated with watermarks, watermark embedding, and watermark detecting. In addition, those of ordinary skill in the art are familiar with the typical problems associated with proper watermark detection after a marked signal has undergone changes (e.g., unintentional noise and malicious attacks).

Herein, such a digital watermark may be simply called a "watermark." Generically, it may be called an "information pattern of discrete values."

Desiderata of Watermarking Technology

Watermarking technology has several highly desirable goals (i.e., desiderata) to facilitate protection of copyrights of video content publishers. Below are listed several of such goals.

Perceptual Invisibility. The embedded information should not induce perceptual changes in the video quality of the resulting watermarked signal. The test of perceptual invisibility is often called the "golden eyes and ears" test.

Statistical Invisibility. The embedded information should be quantitatively imperceptive for any exhaustive, heuristic, or probabilistic attempt to detect or remove the watermark. The complexity of successfully launching such attacks should be well beyond the computation power of publicly available computer systems. Herein, statistical invisibility is expressly included within perceptual invisibility.

Tamperproofness. An attempt to remove the watermark should damage the value of the video well above the hearing threshold.

Cost. The system should be inexpensive to license and implement on both programmable and application-specific platforms.

Non-disclosure of the Original. The watermarking and detection protocols should be such that the process of proving video content copyright both in-situ and in-court, does not involve usage of the original recording.

Enforceability and Flexibility. The watermarking technique should provide strong and undeniable copyright proof. Similarly, it should enable a spectrum of protection levels, which correspond to variable video presentation and compression standards.

Resilience to Common Attacks. Public availability of powerful digital video editing tools imposes that the watermarking and detection process is resilient to attacks spawned from such consoles.

Hard-to-Break. A watermark is "hard-to-break" when it is "extremely hard" for an attacker to break the watermark even though the attacker may know watermarking technique. Here, "breaking" refers to successfully modifying or removing the watermark. In particular, it should be nearly impossible to break the mark under almost all practical situations even if an attacker has a supercomputer.

Watermark Circumvention

In general, there are two common classes of malevolent attacks:

1. De-synchronization of watermark in digital video signals. These attacks alter video signals in such a way to make it difficult for the detector to identify the location of the encoded watermark codes.
2. Removing or altering the watermark. The attacker discovers the location of the watermark and intentionally alters the video clip to remove or deteriorate a part of the watermark or its entirety.

Particular Video Watermarking Challenges

A video is a series of video "frames." Each frame of the video is an image. Since videos are a series of images, one way to watermark a video is to embed a watermark (wholly or partially) in each frame (or a significant number) of the video.

As mentioned earlier, watermarking a video sequence presents a series of significant challenges that are greater than those faced when watermarking other "digital goods." Particular examples of these challenges include perceptual invisibility and resistance to de-synchronization attacks. Although watermarking other types of media (e.g., images and audio) also faces these challenges, the problems of perceptual invisibility and resistance to de-synchronization are particularly acute and specifically unique for videos.

De-Synchronization Attacks

The watermark (or portions thereof) may be embedded into each frame of the video. However, the chances of a digital pirate discovering the watermark increases as the watermark repetition increases. Embedding the watermark (or portions thereof) in each frame is also undesirable because it provides convenient range for the pirate to focus her efforts. In addition, it provides potentially thousands of bounded targets (i.e., frames) containing the same hidden data (i.e., the watermark). With this much bounded information, a digital pirate has a good chance of determining the watermark.

To overcome this problem, watermarks (or portions thereof) may be selectively encoded in individual frames or groups of frames within the video. To find the encoded information later, the detector typically must be synchronized along the temporal axis so that it know where (or when) to look for the watermarks. Digital pirates know this. A de-synchronization attack is one of their most watermark-fatal arrows in their quiver. In addition, de-synching may occur unintentionally particularly when video signal is transmitted.

Resisting de-synchronization is a particularly difficult challenge in the video realm. A pirate may, for example, do any of the following to de-synch a video:

remove frames;

add new frames (such as commercials);

add copied frames (copies of adjacent frames);

change frames/sec rate;

rearrange frames.

If this de-synch attack splits a series of frames in which the full watermark is encoded, then the watermark may go undetected. If this attack manages to remove the isolated frames including the watermarks, then the watermark may go undetected.

Perceptual Invisibility

As mentioned above, a watermark should be perceptually invisible (which include statistically invisible) within the signal. Achieving perceptual invisibility is a particularly difficult challenge in the video realm.

Typically, a series of successive frames have one or more common sections. These common sections contain the same image data. For example, if the camera capturing the video frames is fixed on relatively stationary objects or people, then the vast majority of each frame will be identical. Typically, if the camera is fixed, the background remains identical in each frame.

If the watermark (or portions thereof) is not encoded in every frame of the video, then some frames will have no portion of the watermark encoded therein. Consequently, there will be a transition between encoded frames and non-encoded frames. Typically, perceptible "flicker" occurs at that transition. Flicker is the perceptible manifestation of the transition. This problem is particular to video.

Flicker may be visible to the human eye. If not, it may be noticeable by statistical analysis tools. Since watermark encoding introduces "noise" into a frame, the transition from "noisy" to "noiseless" frame produces perceptible flicker in the common sections of the frames of that transition.

Armed with the knowledge of flickering, a digital pirate can focus her attack on the frames in and around transitions.

Framework to Thwart Attacks

Accordingly, there is a need for a new framework for hiding and detecting watermarks in digital video signals that is effective against unintentional and intentional modifications. In particular, the framework should be resistant to de-synchronization. The framework should possess several attributes that further the desiderata of watermark technology, described above. In particular, it should be perceptually invisible; thus, it should minimize or eliminate flicker.

SUMMARY

Described herein is a technology facilitating the protection of rights in the content of a video sequence. This technology further generally relates to a technology facilitating embedding imperceptible, de-synchronization-resistant watermarks in video sequence and facilitating detecting such watermarks.

One or more implementations, described herein, hide and/or detect stealthy and robust watermarks in digital video signals. These watermarks are resistant against unintentional and intentional modifications. In particular, the watermarks are resistant to de-synchronization. In addition, the watermarks are perceptually invisible. The watermarks are hidden in the video so that flicker is minimized or eliminated.

More specifically, one or more implementations, described herein, hide a watermark (of portions thereof) over one or more regions of successive frames. Each region has a center defined by a hash value. A watermark (of portions thereof) is encoded into the region in a "plateau" manner. The mark (of portions thereof) is filly encoded in the frames surrounding the region's center, but trail off towards the edges of the region.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of Robust and Stealthy Video Watermarking that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the present invention. Rather, the inventors have contemplated that the present invention might also be embodied and implemented in other ways, in conjunction with other present or future technologies.

An example of an embodiment of Robust and Stealthy Video Watermarking may be referred to as an "exemplary video watermaker."

Incorporation by Reference

The following co-pending patent applications are incorporated by reference herein (which are all assigned to the Microsoft Corporation):

U.S. patent application Ser. No. 09/390,271, entitled "A Technique for Watermarking an Image and a Resulting Watermarked' Image" filed Sep. 7, 1999;

U.S. patent application Ser. No. 09/390,272, entitled "A Technique for Detecting a Watermark in a Marked Image" filed on Sep. 7, 1999;

U.S. patent application Ser. No. 09/316,899, entitled "Audio Watermarking with Dual Watermarks" filed on May 22, 1999;

U.S. patent application Ser. No. 09/614,660, entitled "Improved Stealthy Audio Watermarking" filed on Jul. 12, 2000;

U.S. patent application Ser. No. 09/843,234, entitled "Robust Recognizer of Perceptually Similar Content" filed on Apr. 24, 2001;

U.S. patent application Ser. No. 09/843,279, entitled "Derivation and Quantization of Robust Non-Local Characteristics for Blind Watermarking" filed on Apr. 24, 2001;

U.S. patent application Ser. No. 09/843,254, entitled "Recognizer of Audio-Content in Digital Signals" filed on Apr. 24, 2001; and U.S. patent application Ser. No. 09/421,986, entitled "System and Method for Hashing Digital Images" filed on Oct. 19, 1999.

Introduction

Figure 7:
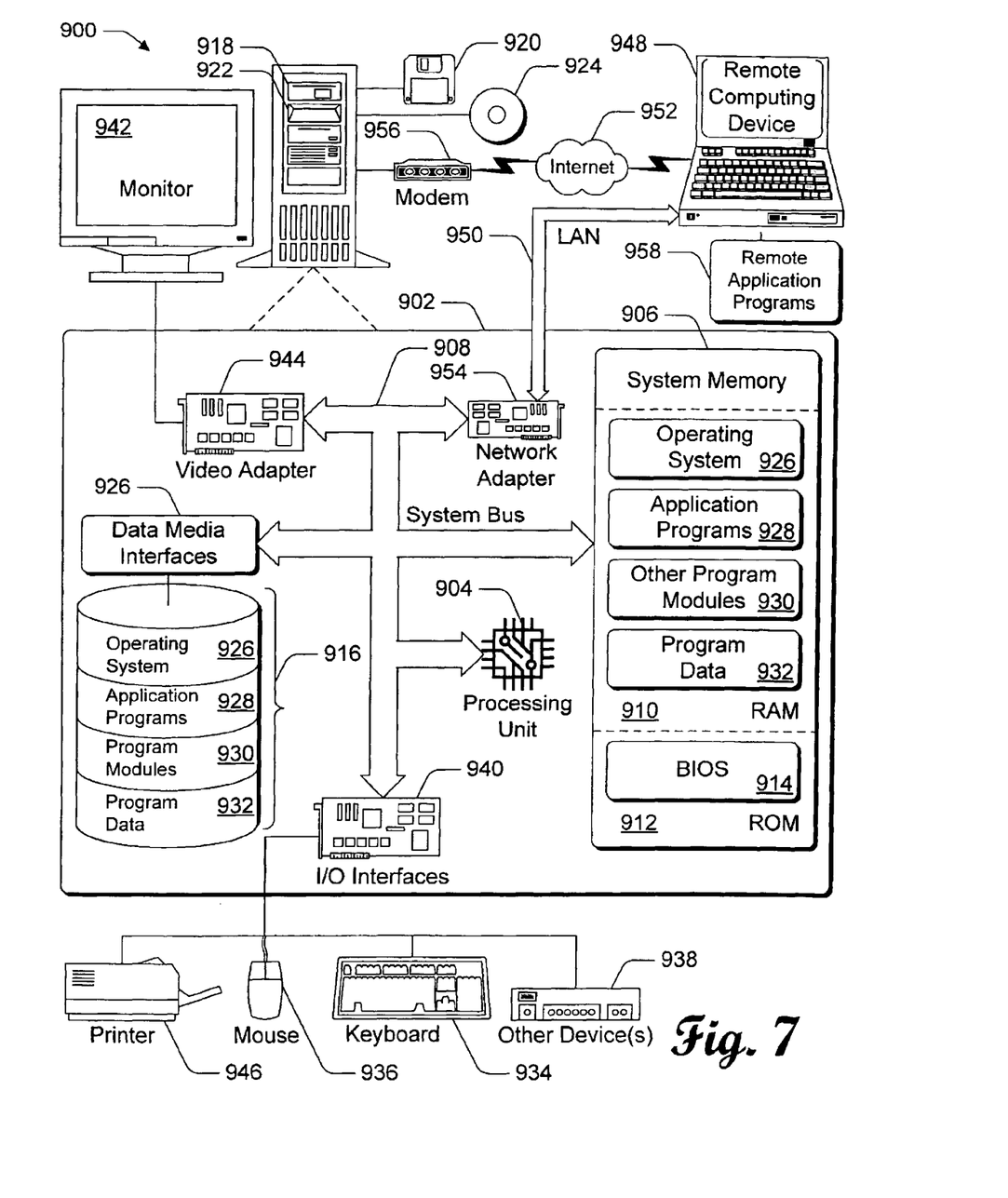
FIG. 7 is an example of a computing operating environment capable of implementing an implementation (wholly or partially) of the invention herein.

The one or more exemplary implementations, described herein, of the present invention may be implemented (whole or in part) by a video watermarking architecture 200 and/or by a computing environment like that shown in FIG. 7.

Herein, references to embedding or detecting a watermark expressly includes the embedding or detecting of a portion of a watermark. Portions of the watermark may, for example, be embedded in a single frame. The collection of such frames may constitute the entire watermark. Moreover, references herein to watermarks expressly include any information data patterns.

With the exemplary video watermaker, the watermarks are encoded (e.g., embedded) over regions of successive frames. These regions include successive adjacent frames. These regions may also be called "temporal regions" since the frames typically fall into a specific time sequence in the video signal. Herein, they may also be called "sequence regions" and "neighbor regions."

A marked video includes multiple regions. The centers of each are apparently randomly selected. The watermark is encoded into the region in a "plateau" manner. The region is approximately plateau shaped. This means that the watermark is fully encoded in the frames surrounding the region's center, but trail off towards the edges of the region.

Typically, the watermark detection of the exemplary video watermaker approximately locates the center of each region. Since the watermark is encoded over a region of frames (rather than isolated single frames), the watermark detection system can find the embedded mark anywhere within the region. This is true even when it fails to locate the exact center of the region because of de-synchronization. In context of sequence regions that are approximately plateau shaped, they may be called "plateau regions," "watermark plateaus," and the like.

Described herein, the exemplary video watermaker has at least two approaches: a "fully blind" and "partially blind" approach.

Hashing

Generally, hashing techniques are used in many areas such as database management, querying, cryptography, and many other fields involving large amounts of raw data.

In general, a hashing technique maps a large block of raw data into relatively small and structured set of identifiers. These identifiers are also referred to as "hash values" or simply "hash." By introducing a specific structure and order into raw data, the hashing function drastically reduces the size of the raw data into short identifiers. It simplifies many data management issues and reduces the computational resources needed for accessing large databases.

Mathematically, a hashing technique includes a hashing function $H(\cdot)$. That function takes a signal x as input and computes a short vector $h=H(x)$. That vector is an apparently random value in some large set. That vector h is a hash value.

Alternatively, the hashing technique may employ a secret key K. This cryptographic hashing technique includes a hashing function $H_K(\cdot)$. That function takes a signal x as input and computes a short vector $h=H_K(x)$. That vector (i.e., hash value) is an apparently random value in some large set, but it is indexed by a secret key K.

A hash value may be thought of as a binary string given a signal (e.g., an image). This string serves as the signature of the input signal and is approximately invariant under all acceptable modifications on the input signal (i.e., modifications under which the quality of the input image is preserved for all practical purposes). To be more precise, the hash technique used by the exemplary video watermaker operates on frames (i.e., images) of a video signal such that:

The hash values possess approximate uniform distribution;

The hash values of two perceptually distinct signals (e.g., images) are approximately independent; and The hash values of two perceptually similar signals (e.g., images) are the same with high probability.

Herein, perceptual similarity may be thought of in this manner: If two signals (e.g., images) are perceptually similar, then an observer should be able to say that they are indeed the same signals (e.g., images) for all practical purposes, such that a reasonable amount of perceptual quality is maintained. Such perceptual qualities also applies to statistical analysis of machines as well as humans.

In addition, for the purpose of identifying the location of the watermark in a video signal, an intermediate hash function serves equally well as a final hash function. See the descriptions in the incorporated pending U.S. patent applications (in particular, the ones entitled "Robust Recognizer of Perceptually Similar Content" and "Recognizer of Audio-Content in Digital Signals") for more details on intermediate and final hashing.

When selecting an intermediate hash function, the hash values of perceptually distinct signals are distant from each other (in the sense of $d(.,.)$) and hash values of perceptually similar signals are close to each other (in the sense of $d(.,.)$). Herein, $d(.,.)$ refers to normalized Hamming distance.

For more information about hashing techniques that may be employed with the exemplary video watermaker, see the following pending U.S. patent applications (which are incorporated by reference):

Ser. No. 09/843,234, entitled "Robust Recognizer of Perceptually Similar Content" filed on Apr. 24, 2001;

Ser. No. 09/843/254, entitled "Recognizer of Audio-Content in Digital Signals" filed on Apr. 24, 2001; and Ser. No. 09/421,986, entitled "System and Method for Hashing Digital Images" filed on Oct. 19, 1999.

Exemplary Video Watermarking Overcomes the Particular Challenges

As mentioned earlier, watermarking a video sequence presents a series of significant challenges that are greater than those faced when watermarking other digital goods. Particular examples of these challenges include perceptual invisibility and resistance to de-synchronization. Although watermarking other types of media (e.g., images and audio) also faces these challenges, the problems of perceptual invisibility and resistance to de-synchronization are particularly acute and specifically unique for videos.

De-Synchronization

The watermark (or portions thereof) may be embedded into each frame of the video. However, the chances of a digital pirate discovering the watermark increases as the watermark repetition increases. Embedding the watermark (or portions thereof) in each frame is also undesirable because it provides convenient range for the pirate to focus her efforts. In addition, it provides potentially thousands of bounded targets (i.e., frames) containing the same hidden data (i.e., the watermark) that the pirate may attack. With these narrow targets, a digital pirate has a good chance of determining the watermark.

To overcome this problem, the exemplary video watermaker selectively encodes watermarks (or portions thereof) into sequence regions within the video. To find the encoded information later, the exemplary video watermaker approximately locates the centers of these regions by hashing the video signal.

If a de-synch attack removes, adds, or rearranges frames, the center determined by the detection system of the exemplary video watermaker offset from the true center of the region. Since the multiple frames within that region are encoded with the watermark, the exemplary video watermaker can detect the watermark in a frame offset from the center. The de-synch would need to significantly alter the video signal before the center determined by the detection system of the exemplary video watermaker is offset enough to be miss the region entirely.

Perceptual Invisibility

The exemplary video watermaker encodes a watermark that is perceptually invisible within the signal. It minimizes or eliminates flicker caused by watermark encoding.

The watermark is encoded into the sequence region in a "plateau" manner. This means that the watermark is fully encoded in the frames surrounding the region's center, but trail off towards the edges of the region.

The trailing edges of the plateau give the region boundaries a softer transition between marked frames and unmarked frames. This is significantly less perceptible—statistically and visually—than the "flicker" of traditional video watermarking.

Plateau-Shaped Sequence Regions

Video Sequence Example

Figure 1A:
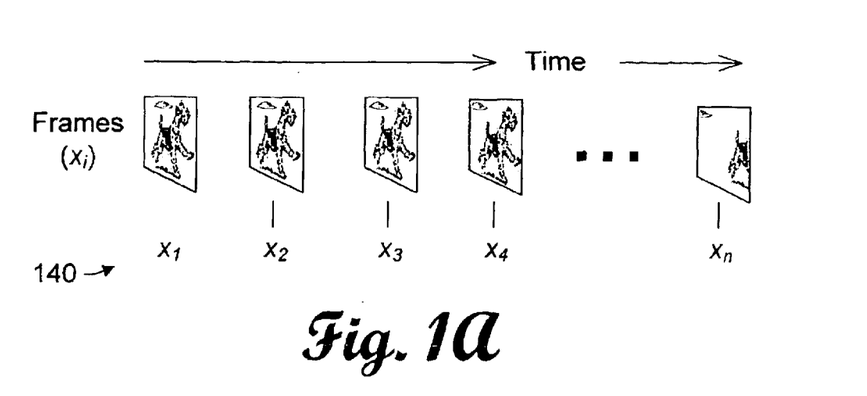
FIG. 1A illustrates the frames (i.e., images) of a video sequence.

FIG. 1A illustrates an example of a series of individual images (i.e., frames) that collectively compose a video sequence over time. This example video sequence includes frames 140. These frames are labeled $x_i$, where i=1, 2, ..., n. The numbered order of the frames (1, 2, ..., n) indicates the typical chronological order of the frames. This video sequence may be all of or any portion of a complete video package.

Plateau-Shaped Watermarked Region

Figure 1B:
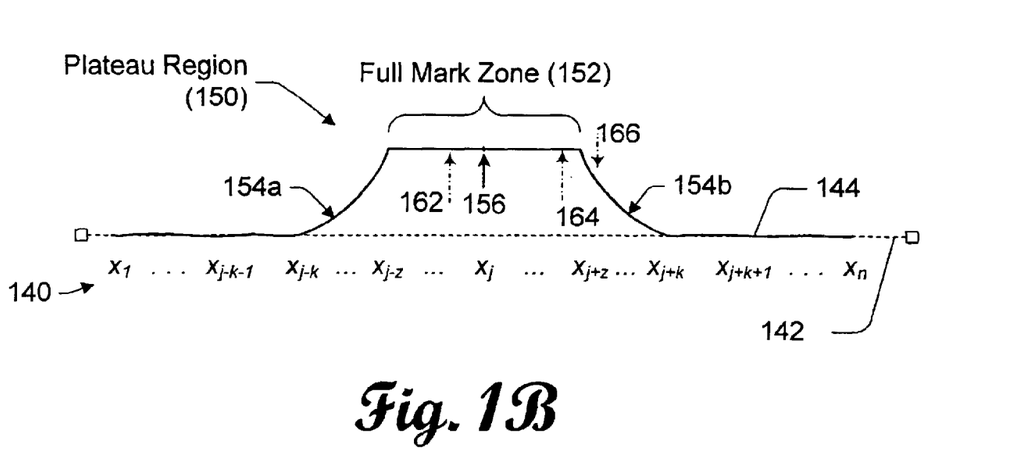
FIG. 1B is a diagram illustrating a "plateau" shape of the watermarking of a sequence region; this illustrates an example of a watermarked sequence region in accordance with an implementation of the invention herein.

FIG. 1B illustrates a diagram of a plateau-shape of the watermarked sequence region. This illustrates an example of a watermarked sequence region in accordance with the exemplary video watermaker. The "plateau-shaped" watermark encoding technique of the exemplary video watermaker reduces (or eliminates) the effect of de-synchronization and flicker.

The frames 140 are indicated by the same $x_i$ labeling as FIG. 1A. Dashed horizontal line 142 indicates a baseline of a video signal without watermark encoding. Solid line 144 indicates the actual video signal relative to the baseline 142. A video signal—such as the one indicated by line 144—is typically not perfectly smooth, straight, etc. For the sake of simplicity, video signal 144 is illustrated in FIG. 1B in an idealized form.

In accordance with the exemplary video watermaker, an information pattern (such as a watermark or a portion thereof) is embedded into the video signal 144. This may be accomplished using traditional or new watermarking techniques. Image watermarking techniques may be used to embed watermarks into the frames of the video signal.

Within a range of frames, the watermark is embedded. That range of frames is called the plateau region 150. The plateau region ranges from frame $x_{j-k}$ to $x_{j+k}$ in FIG. 1B, where j is the center of the region and 2k+1 is the length of the region. The center frame of the region 150 is frame $x_j$ or frame 156.

The center frame (e.g., frame 156) is determined by hashing the video signal (or portions thereof). Thus, the locations of the centers of each region are determined by the inherent characteristics of the signal itself.

Alternatively, when embedding the watermark, the center frame 156 might not be the exact frame determined by the hashing. Thus, the region may be offset from the frame determined by the hashing. This may be called "offset centering" of the region. The degree of the offset may be determined pseudorandomly, mathematically, via hashing, and/or it may be fixed. Assuming that the detection system is capably of reliably detecting the watermarks, this offset centering is acceptable and within the scope of the exemplary video watermaker described herein. It is particularly acceptable because it adds the robustness of the exemplary video watermaker.

Full Mark Zone (FMZ) of the Plateau. The watermark is fully encoded in the frames surrounding the center frame 156. Theses surrounding frames form a zone called a full mark zone (FMZ) 152. The FMZ 152 ranges from frame $x_{j-z}$ to $x_{j+z}$ in FIG. 1B, where 2z+1 is the length of the zone. In other words, the full mark zone (such as FMZ 152) includes z frames before the center frame 156 and z frames before the center frame. With reference herein to the FMZs and the plateau regions, the terms "fully encoded," "gradient encoding," and "partially encoded" refer to the relative intensity (e.g., relative strength or scale) with which the mark is encoded. "Fully encoded" is full relative intensity.

Generally, fully encoding the watermark in the FMZ 152 of the plateau region 150 increases the robustness of the watermark encoded by the exemplary video watermaker. Primarily, it reduces (or eliminates) the effect of de-synchronization on a video signal (such as signal 144).

Edges of the Plateau. The plateau region 150 includes gradient edges 154a and 154b in FIG. 1B. On the leading side of the FMZ 152 is leading edge 154a. On the trailing side of the FMZ 152 is trailing edge 154b. Within these edges the watermark is partially encoded. More precisely, the watermark is gradiently encoded, which is either increasingly or decreasingly encoded.

For leading edge 154a, the relative intensity with which the mark is encoded increases with successive frames. The leading edge 154a ranges from frame $x_{j-k}$ to $x_{j-z}$ in FIG. 1B, where k–z is the length of this edge.

Typically, the trailing edge 154b is the mirror image of leading edge 154a. For trailing edge 154b, the relative intensity with which the mark is encoded decreases with successive frames. The trailing edge 154b ranges from frame $X_{j+z}$ to $X_{j+k}$ in FIG. 1B, where k–z is the length of this edge.

Alternatively, the values of k and z on either size of the center need not be equivalent. In particular, the value of k–z may differ for the leading and trailing edges (e.g., edges 154a and 154b). In this situation, the edges are not mirror images of each other. However, this would make the "center" of the region be off the true center. Assuming that the detection system is capably of reliably detecting the watermarks, this type of approximate centering is acceptable and within the scope of the exemplary video watermaker described herein. It is particularly acceptable because it adds the robustness of the exemplary video watermaker.

As introduced in the Background section, a malicious attacker can easily find abrupt changes in the intensity of consecutive video frames. Such abrupt changes are common in traditional video watermarking. These changes produce a perceptible flicker effect.

The gradient edges (e.g., edges 154a and 154b) of the plateau region 150 give the region's boundaries a softer transition between marked frames and unmarked frames. The smooth transition of the gradient edges is significantly less perceptible—statistically and visually—than the "flicker" of traditional video watermarking.

Generally, gradient encoding the watermark in the FMZ 152 of the plateau region 150 increases the robustness of the watermark encoded by the exemplary video watermaker. Primarily, it reduces (or eliminates) the effect of flicker on a video signal (such as signal 144).

Shape of Plateau Regions. The shape of a plateau region is representative of the relative intensity of the watermarking encoding of that region. The shapes of the plateau regions illustrated herein (in particular, in FIGS. 1B and 1C) are only examples. The name "plateau" is intended to be a convenient label that evokes an image of the overall general shape of the region. However, the shapes of the plateau regions are not limited to those illustrated herein or to the shape of a literal plateau.

With respect to the shape of a plateau, it may take nearly any shape. The range of shapes are bounded by characteristics described in the language claimed herein. Examples of such characteristics of a plateau regions generated by the exemplary video watermaker include:

one or more frames within the region is fully encoded relative to other frames (in particular, unmarked frames);

one or more frames within the region are gradiently encoded relative to the fully encoded frames and the unmarked frames.

With these characteristics in mind, a plateau region generated by the exemplary video watermaker may be described, for example, with the following shape descriptions: bump, convex, gibbous, bulge, lump, hump, bulbous, mountain-shaped, peak, mound, mesa, hill, knoll, hillock, butte, drumlin, hummock, dune, tussock, molehill, anthill, dome, arch, hemisphere, half-circle, trapezoid, and the like.

Watermark Detection with the Plateau Regions. A watermark detection system of the exemplary video watermaker processes a subject video signal. Typically, before such detection, it is unknown whether such signal includes a watermark. Likewise, it is unknown whether the subject signal has been modified from the original signal. Such modification may be intentional or unintentional.

Using hashing techniques, the watermark detection system approximately locates the center of each plateau region. More precisely, it locates frames that it considers the centers of their regions. These frames are called "detection frames" herein. To find the detection frames, the watermark detection system uses the same technique as the embedding system uses to locate the regions' center frames.

Typically, the subject video signal itself is hashed to find the detection frames. If the subject signal remains unmodified from the original, then the detection system finds the actual center of each region. If the subject signal has been modified, then the "centers" found by the detection systems approximate the centers of the regions.

However, the watermark detection system need not find the actual center of a region to detect a watermark encoded within the region. Since the watermark is encoded in each of the frames of the plateau region, the watermark detection system is likely to find the embedded mark anywhere within the region. However, if the approximate center determined by the detection system falls within a full mark zone (FMZ), then it is more likely to detect the watermark then if the if the approximate center falls within a boundary edge.

For example, assume that video signal 144 of FIG. 1B is a subject signal and that it has been de-synchronized (intentionally or unintentionally). The actual center of the signal before such de-synchronization was frame 156. However, the approximate center—determined by hashing the de-synchronized subject signal—may be frame 162, frame 164, or frame 166. These frames are indicated by dashed-dotted arrows pointing to the encoded signal of the region 150 of FIG. 1B.

Frame 162 is just off-center from the center frame 156. Like the center frame and every other frame in the FMZ 152, it is fully encoded with the watermark. Consequently, the detection system is highly likely to detect the encoded watermark within frame 162.

Frame 164 is more off-center from the center frame 156 than frame 162, but it is still within the FMZ 152. Similarly, the detection system is highly likely to detect the encoded watermark within frame 164.

Frame 166 is significantly off-center from the center frame 156. So much so, that it falls outside the FMZ 152. However, it still is within the plateau region 150. Specifically, it is within trailing edge 154*b*. Although the watermark is not fully encoded within this edge, it is still partially encoded in frame 166 of edge 156*b*. Consequently, there is a possibility that the detection system may detect the encoded watermark within frame 166.

However, since the mark is only partially encoded there is an increased possibility of missing the watermark. In this situation, the video has most likely been de-synched sufficiently to produce a modified video that is perceptually different from the original video.

Conventional watermark detection encodes the marks in isolated frames. With FIG. 1B, if the mark was only encoded in frame 156, the de-synch attack would cause the conventional watermark detection to miss frame 156 because it would be looking for the mark in frames 162 or 164.

Multiple Regions

Figure 1C:
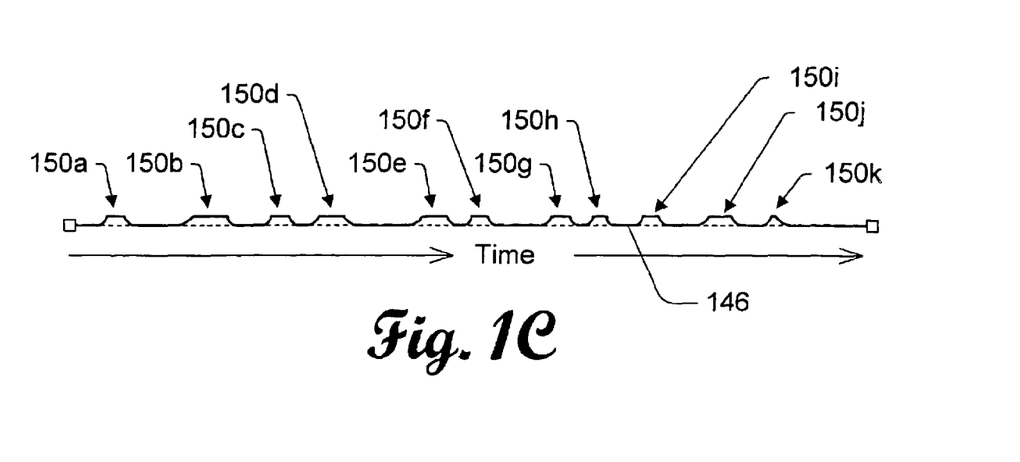
FIG. 1C is a diagram illustrating multiple plateau-shaped sequence regions of a video signal; this illustrates an example of multiple watermarked sequence regions of a signal which is in accordance with an implementation of the invention herein.

FIG. 1C is a diagram illustrating an example video signal 146 having multiple watermarked plateau regions 150*a*–150*k* in accordance with the exemplary video watermaker. The center of the plateau regions 150*a*–150*k* is defined (i.e., located) by a hash value. Multiple hash values are determined by hashing the signal itself.

As a consequence of the almost uniform distributed nature of hash values, the plateau regions are distributed throughout the signal in an almost uniform and manner that appears random. Moreover, as illustrated in FIG. 1C, the size and shape of the regions may be varied.

Partially and Fully Blind Approaches

The exemplary video watermaker may be implemented via, at least, two approaches: "Partially Blind" and "Fully Blind." Both are broadly shown in FIGS. 3–6.

Partially Blind Approach:

In the partially blind approach, the exemplary video watermaker selects multiple frames of the video. These selected frames will be the center frames of plateau regions. To select these center frames, the exemplary video watermaker may randomly or pseudorandomly select them. The center frames define the center of the plateau region for embedding marks.

Once the frames are selected, the exemplary video watermaker hashes those selected frames and stores their hash values. These will be called the "center frame hash values" herein. These values identify the locations of center frames for watermark embedding. These hash values may use a secret key; thus, may be pseudorandom also.

Once these hash values are found, the watermarks are inserted in the plateau regions of the selected center frames. The hash values are stored in a data storage. The locations of the center frames are not stored. Rather, the hash values of those center frames are stored.

The hash values are sent as side information to the watermark detection system. For this approach, it is assumed that the watermark detection system has secure access to the stored hash values of the center frames. The hash values may be cryptographically transmitted to the detection system along with or separate from the video signal being examined by the system. Regardless, this approach assumes that users (and attackers) do not have access to them.

For example, the hash values may be sent to a software video player on a computer (or to a DVD player) secretly and the user does not know what these hash values are. Another example could be cryptographic encryption of these hash values via a secret key and transmitting them secretly or spreading them around video data in a secret manner such that attackers would not be able to find them.

At the detector end, the hash value of each frame is found and compared to the hash values in the stored list of hash values. For the frames whose hash values substantially match an entry in the list, the detector looks for watermark in that frame. Those frames are called the "detection frames." Alternatively, it looks for the watermarks in frames—whose hash values does the match—surrounding a detection frame. This is done for each detection frame. The detection frames effectively "synch" the watermark detection process.

The term partially blind comes from the fact that additional information is needed at the detector side, meaning it is not completely blind. But it is not non-blind as well. A non-blind watermarking scheme requires the original unmarked video to be present at the detector end.

With this approach, an attacker may determine the locations of the detection frames. To find the detection frames, the attacker only needs to determine the hashing function and gain access to the list of hash values (for the center frames).

Fully Blind Approach:

The fully blind approach is the same as the partially blind approach, except that there is no list of center frame hash values. Thus, the watermark detection system has no list of hash values to compare to the hash of the frames of a subject video signal. Instead, the watermark detection system calculates the hash values based upon the subject video signal.

A comparison between the hash values and randomly generated binary vectors is made in order to decide if the watermark is going to be embedded or not. At the decoder side, the same operation is carried out using the same secret key.

By using a secret key, the fully blind approach generates a set of random binary sequence a. This might be, for example, 10 random bits. Then the hash value of each frame within the video sequence is computed, call these $h_i$, where i indexes frame number.

As an example, assume that these hash values are of length 100. Randomly chosen 10 locations from a length 100 vector are used and bits from those locations are collected (for each frame independently) to construct the "symbol" of that frame (in other words, the "symbol" of each frame is generated from the hash value of that frame by random projection, in this particular example the projection ration is 10/100=0.1). Call the symbols $s_i$, where i indexes the frames. Once the symbol of each frame is computed, it is compared with the initially randomly found vector (i.e., one compares $s_i$ with a for all i. Once there is an exact match, the watermark is embedded around it in a plateau manner.

This approach is random in the following aspects: first, vector a is generated randomly; second, each value $h_i$ is the hash value of frame i. In addition, by the definition of the hash function, they are also generated randomly, then generation of $s_i$ from $h_i$ are also done in a random manner. Secret key K is used as the seed of the random number generator in all these steps.

At the detector end, it has access to K. It does the same as above to find the frame locations. It generates a; it generates hash values; and applies random projection. It finds the detection frames, which may or may not be identical to the center frames.

The same secret key and hash function is used for hashing the center frame for embedding as is used for hashing the detection frames for detecting. Therefore, if the original unmarked signal and the subject signal are perceptually identical, then the hash values of the frames will be identical or nearly so.

The unmarked signal and subject signal will be perceptually identical is the subject signal if an unmodified version of the marked signal. Furthermore, the unmarked signal and subject signal will be perceptually identical if the subject signal is a modified version (e.g., an attacked version) of the marked signal, but such modification did not perceptually modify the signal.

Thus, to determine where the detection frames are located, an attacker must know the secret key and the hash function. This approach is particularly appropriate when there is great concern about malicious attacks.

In both approaches, the centers of regions around which watermark is going to be embedded are determined. This task may be carried out via using robust image hash functions. In partially blind approach, the hash values are used to determine the locations of the watermarks at the decoder; thus, partially blind approach is termed to be "partially blind".

In fully blind approach, a comparison between the hash values and randomly generated binary vectors is made in order to decide if the watermark is going to be embedded or not. At the decoder side, the same operation is carried out using the same secret key; therefore, the fully blind approach is a completely blind approach.

Exemplary Video Watermarking Architecture

Figure 2:
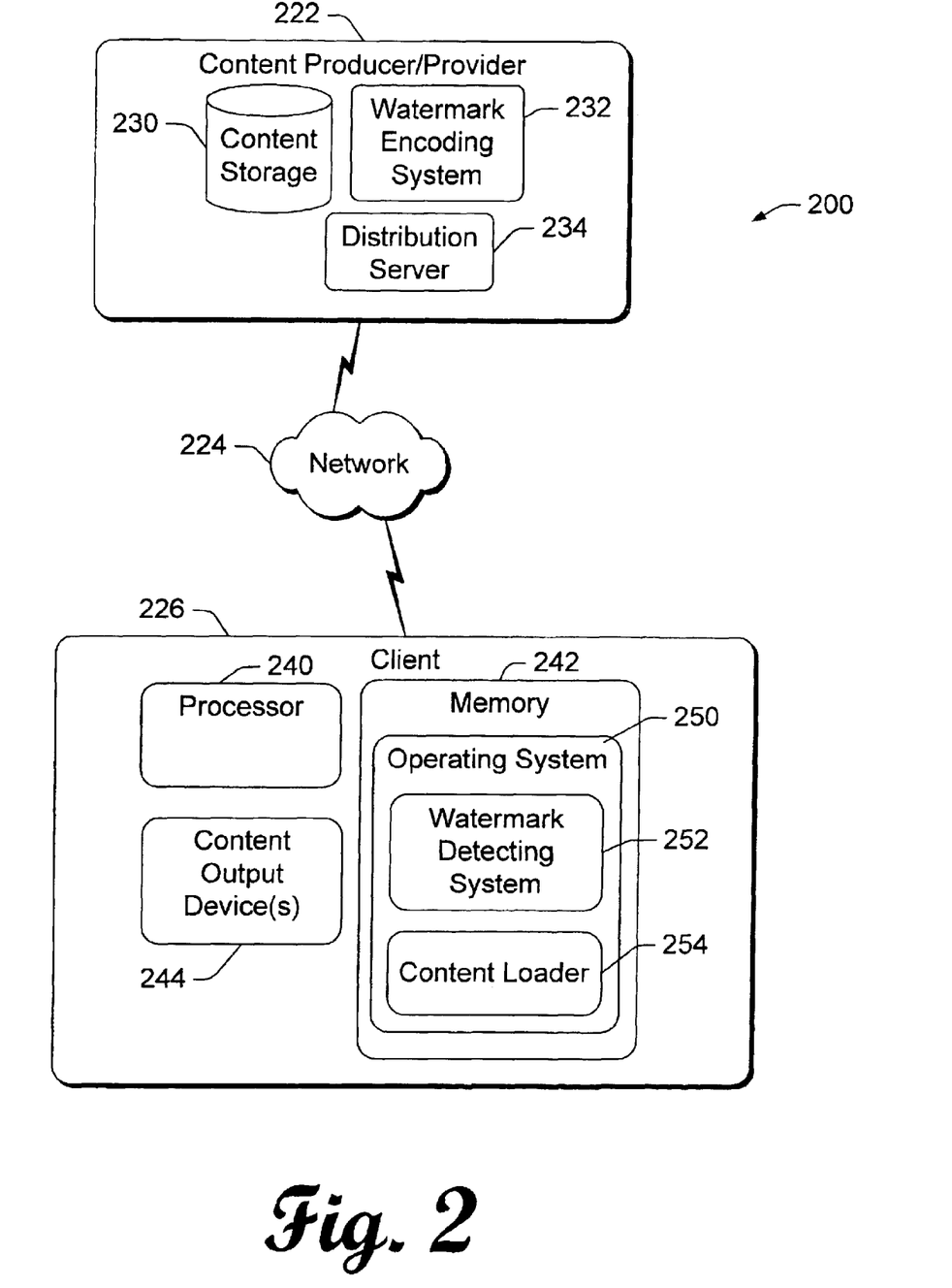
FIG. 2 is a schematic block diagram showing a video watermarking architecture in accordance with an implementation of the invention herein.

FIG. 2 shows a digital goods production and distribution architecture 200 (e.g., video watermarking architecture 200) having a content (e.g., video) producer/provider 222 that produces original content and distributes the content over a network 224 to a client 226. The content producer/provider 222 has a content storage 230 to store digital goods containing original content. The content producer 222 has a watermark embedding system 232 to sign the digital signals (e.g., video signals) with a watermark that uniquely identifies the content as original. The watermark embedding system 232 may be implemented as a standalone process or incorporated into other applications or an operating system.

The watermark embedding system 232 applies the watermark to a digital signal (e.g., video signal) from the content storage 230. Typically, the watermark identifies the content producer 222, providing a signature that is embedded in the signal and cannot be cleanly removed.

The content producer/provider 222 has a distribution server 234 that distributes the watermarked content over the network 224 (e.g., the Internet). A signal with a watermark embedded therein represents to a recipient that the signal is being distributed in accordance with the copyright authority of the content producer/provider 222. The server 234 may further compress and/or encrypt the content conventional compression and encryption techniques prior to distributing the content over the network 224.

Typically, the client 226 is equipped with a processor 240, a memory 242, and one or more content output devices 244 (e.g., television, display, sound card, speakers, etc.). The processor 240 runs various tools to process the marked signal, such as tools to decompress the signal, decrypt the date, filter the content, and/or apply signal controls (tone, volume, etc.). The memory 242 stores an operating system 250 (such as a Microsoft® Windows 2000® operating system), which executes on the processor. The client 226 may be embodied in a many different ways, including a computer, a handheld entertainment device, a set-top box, a television, an appliance, and so forth.

The operating system 250 implements a client-side watermark detecting system 252 to detect watermarks in the digital signal and a content loader 254 (e.g., multimedia player, audio player) to facilitate the use of content through the content output device(s) 244. If the watermark is present, the client can identify its copyright and other associated information.

The operating system 250 and/or processor 240 may be configured to enforce certain rules imposed by the content producer/provider (or copyright owner). For instance, the operating system and/or processor may be configured to reject fake or copied content that does not possess a valid watermark. In another example, the system could load unverified content with a reduced level of fidelity.

Exemplary Video Watermarking Embedding System

Figure 3:
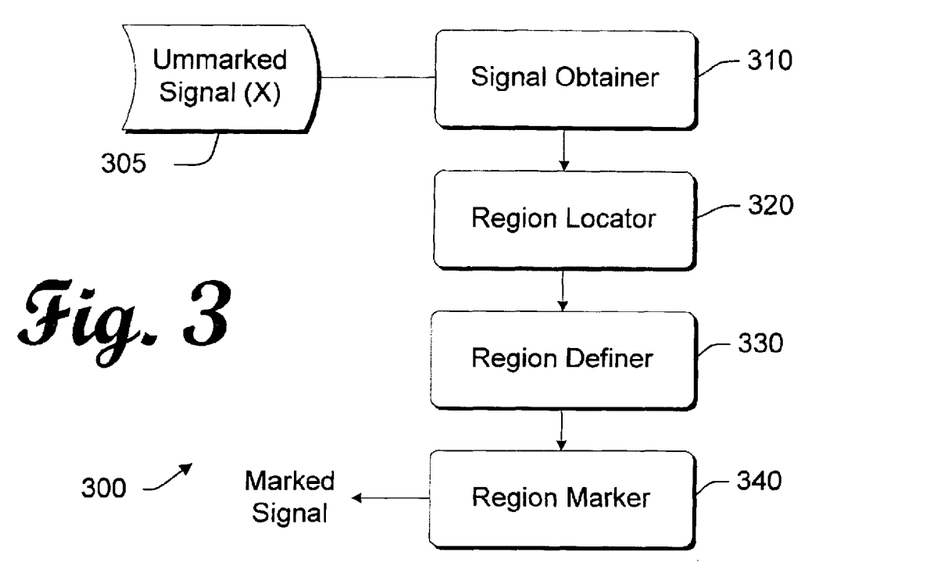
FIG. 3 is a schematic block diagram showing a video watermark embedding system in accordance with an implementation of the invention herein.

FIG. 3 shows an exemplary video watermark embedding system 300, which is an example of an embodiment of a portion of the video watermarking architecture 200. The watermark embedding system 232 is an example of the exemplary video watermark embedding system 300.

The watermark embedding system 300 includes a signal obtainer 310, a region locator 320, a region definer 330, and a region marker 340.

The signal obtainer 310 obtains an unmarked video signal 305. It may obtain the signal from nearly any source, such as a storage device or over a network communications link.

The region locator 320 determines the locations of the regions within the signal 305. To determine the region locations, the system may first determine the center frame (such as frame 156 of FIG. 1B) of each region. It may determine the center frames pseudorandomly. After that, it finds the hash value of the center frames. These hash values effectively identify the locations of the center frames. Thus, the locations of the centers of each region are determined (via the their hash values) by the inherent characteristics of the signal itself. Alternatively, the center frame of a region may be offset from the initial frame determined by the region locator 320.

The region definer 330 defines the parameters of the regions. Such parameters include region length (2k+1) and FMZ length (2z+1). These parameters may fixed for all regions of all signals. They may be fixed for all regions, but varied per signals. They may be varied for all regions of all signals. Generally speaking, the parameters may be manipulated to adjust several factors including watermark detection probability and robustness.

The region marker 340 watermarks the regions of the signal in a plateau manner. The frames of the FMZ are fully encoded while the frames of the boundary edges are gradiently encoded. The region marker may employ traditional or new watermarking techniques particularly those designed for image watermarking. It may employ spread-spectrum, QIM, or other watermarking techniques. This marked video may be publicly distributed to consumers and clients.

The functions of aforementioned components of the exemplary video watermark embedding system 300 of FIG. 3 are explained in more detail above and below.

Methodological Implementation of the Exemplary Video Watermark Embedder

Figure 4:
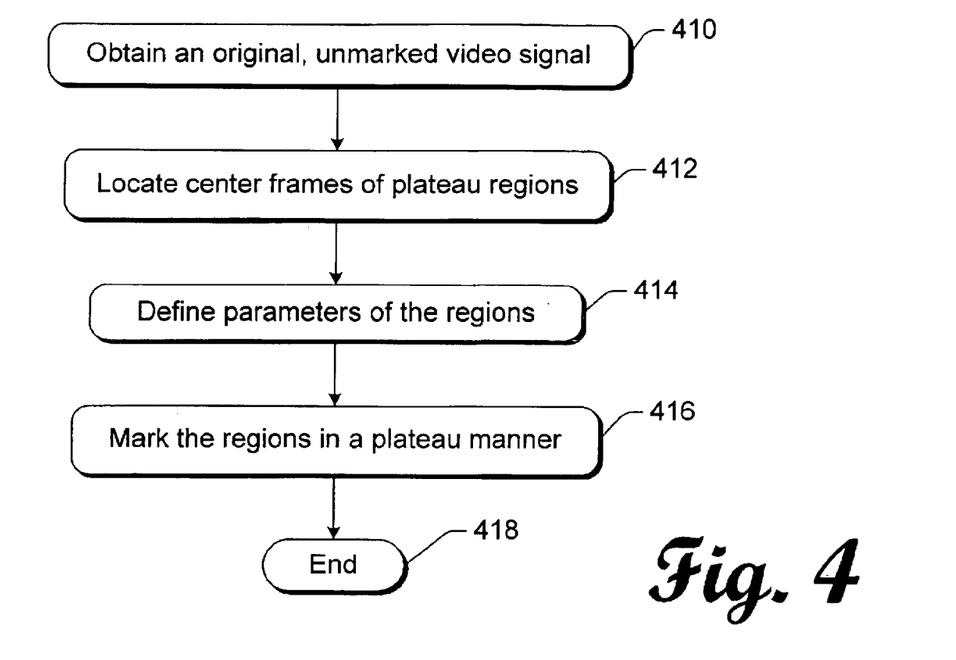
FIG. 4 is a flow diagram showing an illustrative methodological implementation (e.g., video watermark embedding) of the invention herein.

FIG. 4 shows the methodological implementation of the exemplary video watermark embedding system 300 (or some portion thereof). More specifically, this figure shows the methodological implementation of watermark embedding of the exemplary video watermaker. This methodological implementation may be performed in software, hardware, or a combination thereof.

At 410 of FIG. 4, the exemplary video watermaker obtains a video signal. Specifically, this signal is unmarked. At 412, it determines the locations of the plateau regions within the signal. The region locations are determined by pseudorandomly selecting them (using a secret key). The hash values of selected frame is taken and stored. These values are stored. For the partially blind approach, these values are available to the decoding system. For example, they may accompany the signal in a cryptographic envelope or they come via a separate and secure mechanism.

At 414, the exemplary video watermaker defines the parameters of the regions. At 416, it watermarks the regions of the signal in a plateau manner. At 418, the process ends.

Exemplary Video Watermarking Detecting System

Figure 5:
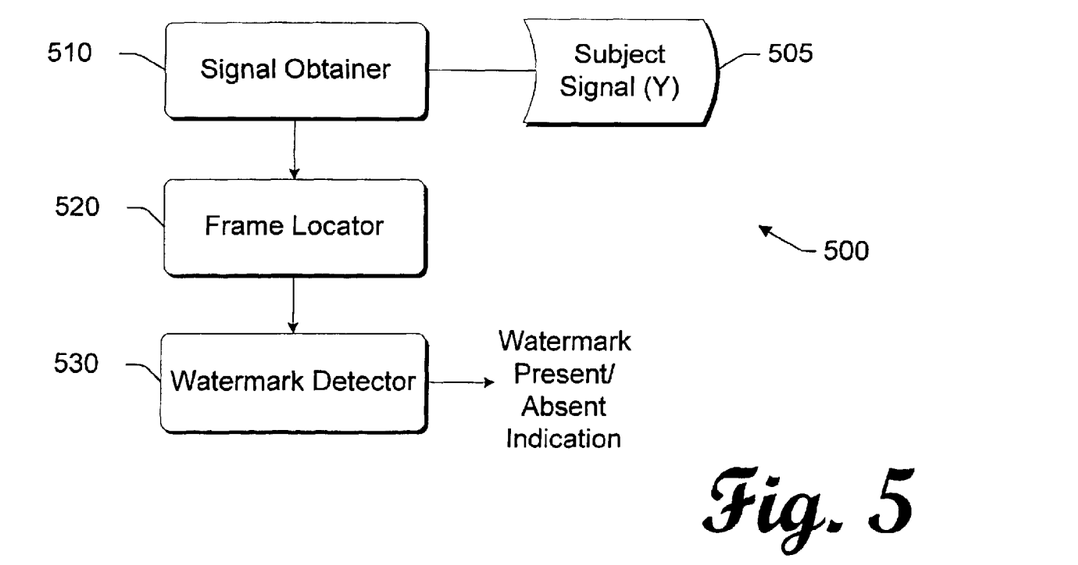
FIG. 5 is a schematic block diagram showing a video watermark detecting system in accordance with an implementation of the invention herein.

FIG. 5 shows an exemplary video watermark detecting system 500, which is an example of an embodiment of a portion of the video watermarking architecture 200. The watermark detecting system 252 is an example of the exemplary video watermark embedding system 500.

The watermark detecting system 500 includes a signal obtainer 510, a frame locator 520, and a watermark detector 530.

The signal obtainer 510 obtains a subject video signal 505. It may obtain the signal from nearly any source, such as a storage device or over a network communications link. Typically, it is unknown whether the subject video signal 505 is marked and whether it has been modified.

The frame locator 520 determines the locations of the "detection frames" of the subject signal 505. The detection frames are the selected frames of the signal that the system will attempt to detect the watermark. The system may also attempt to locate the watermark in frames surrounding the selected detection frames.

For the both the partially and fully blind approaches, the frame locator 520 uses the same hashing technique (including the same secret key) to find the hash values of frames of the subject signal as the watermark embedding system 300 (specifically, the region locator 320) used for the center frame of a region.

For the partially blind approach, the frame locator 520 compares the just calculated hash values of each frame of the subject video to the stored list of hash values (which was originally generated by the watermark embedding system 300). Each exact or substantial match is designated a "detection frame."

For the fully blind approach, the frame locator 520 selects the detects frames by doing a comparison between the hash values and randomly generated binary vectors is made in order to decide if the watermark is going to be embedded or not.

The watermark detector 530 determines whether watermarks exist in the detection frames. The watermark detector employs the detection technique that corresponds the watermarking technique employed by the watermark embedding system 300. The watermark detector 530 indicates whether the watermark is present.

The functions of aforementioned components of the exemplary video watermark detecting system 500 of FIG. 5 are explained in more detail above and below.

Methodological Implementation of the Exemplary Video Watermark Detection

Figure 6:
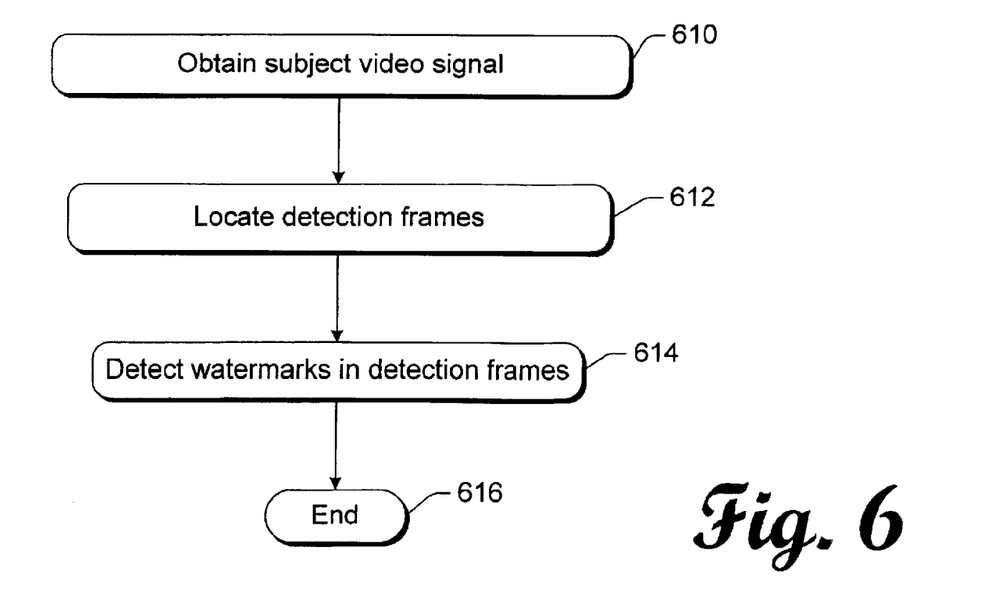
FIG. 6 is a flow diagram showing an illustrative methodological implementation (e.g., video watermark detecting) of the invention herein.

FIG. 6 show methodological implementation of the exemplary video watermark detecting system 500 (or some portion thereof). More specifically, this figure shows the methodological implementation of watermark detecting of the exemplary video watermaker. This methodological implementation may be performed in software, hardware, or a combination thereof.

At 610 of FIG. 6, the exemplary video watermaker obtains a subject video signal. Typically, it is unknown whether the subject video signal 505 is marked and whether it has been modified.

At 612, it determines the locations of the "detection frames" of the subject signal. At 614, the exemplary video watermaker determines whether watermarks exist in the detection frames. The watermark detector employs the detection technique that corresponds the watermarking technique employed by the watermark embedding methodological implementation of FIG. 4. Typically, it also indicates whether the watermark is present. Such indication may be stored, displayed, printed, etc. The process ends at 616.

Other Implementation Details

The "partially blind" approach is partially blind in the sense that it requires the hash values to be known at the decoder side. The "fully blind" approach is completely blind and relies on the fact that the collision probability of the hash values should be low and approximate uniform distribution should be achieved.

Given the input video $\{X_i\}$ of length N, the exemplary video watermaker embeds watermarks $\{w_j\}$, $1 \leq j \leq M$, each of length $L_w$, at M different places. The secret key K is the seed of the pseudorandom number generator in all the randomized tasks in both approaches. Let H(.) denote the hash function to be used that produces a hash of length L. Let a(k) denote the k-th element of an input vector a. Let $f$ be a continuous monotonic even function defined on real numbers such that $f(0)=1$, $f(X)=0$ for $|X| \geq 1$ and $f(|X|) \geq f(|X|+|\epsilon|)$, X, $\epsilon \in R$. Let $\{Y_i\}$ be an input to the watermark decoder.

Partially Blind Approach

Watermark Encoding: Pseudorandomly pick the frames $X_{i_1}, X_{i_2}, \ldots X_{i_M}$ to be the center of the watermark regions, where $i_j \in \{1, 2, \ldots, N\}$, $1 \leq j \leq M$ and $|i_j - i_k| \geq K$ for all $j \neq k$, $1 \leq j$, $k \leq M$. Here $K \in Z^+$ may be a user-selected parameter. Assume w.l.o.g. that $i_1 < i_2 < \ldots < i_M$.

Find $H(X_{i_j})$, $1 \leq j \leq M$.

Find the semi-global statistics $\{\mu_{i_j}\}$ and their quantized values, $\{\hat{\mu}_{i_j}\}$ after watermark embedding for $1 \leq j \leq M$.

Compute sign vectors $s_{i_j}$ for $1 \leq j \leq M$ such that $s_{i_j}(k)=1$ if $\hat{\mu}_{i_j}(k) \geq \mu_{i_j}(k)$ and 0 otherwise.

Pseudorandomly find the watermarking neighborhood widths $\{W_{i_j}\}$ such that $W_{i_j} \in Z^+$, $1 \leq j \leq M$ and furthermore $W_{i_j} + W_{i_{j+1}} \leq K$ for $1 \leq j \leq M-1$ is satisfied.

For frame $X_{i_j+k_j}$, embed the watermark $w_j$ using quantization index modulation (QIM) watermarking and employing $\Delta_j f(k_j/W_{i_j})$ as the quantizer step size and $s_{i_j}$ as the sign vector where $1 \leq j \leq M$, $-W_{i_j} \leq k_j \leq W_{i_j}$, and $\{\Delta_j\}$ are user entered positive parameters.

Watermark Decoding: Given the input video $\{Y_i\}$ of length $N_Y$, compute hash values $H(Y_i)$ for all i.

Find frames $\{Y_{i_j}\}$ for all $1 \leq j \leq M$ such that $d(H(Y_{i_j}), H(X_{i_j})) \leq d(H(Y_k), H(X_{i_j}))$ for all $1 \leq k \leq N_Y$.

For each frame $Y_{i_j+k_j}$, $-\alpha_j W_{i_j} \leq k_j \leq \alpha_j W_{i_j}$, $1 \leq j \leq M$, carry out watermark decoding using quantization index modulation (QIM) watermarking and employing $\Delta_j f(k_j/W_{i_j})$ as the quantizer step size. Here $0 < \alpha_j \leq 1$ are user determined parameters. Let the decoded vectors be $\{w_{D,k_j}\}$.

Given $\{w_{D,k_j}\}$, find $\{w_{D,j}\}$ using the majority rule: $w_{D,j}(l)=1$ if $$\sum_{k_j=-round(\alpha_j W_{i_j})}^{round(\alpha_j W_{i_j})} w_{D,k_j}(l) > round(\alpha_j W_{i_j})$$

and 0 otherwise. Here round(.) denotes rounding to integer operation and $w_{D,j}$ is the resulting decoded vector that is derived from the neighborhood of $Y_{i_j}$.

Declare that the watermark is present if $\max_j d(w_{D,j}, w_j) < T$; not present otherwise.

Fully Blind Approach

Watermark Encoding: Generate M random binary vectors $h_j$, $1 \leq j \leq M$ of length $\bar{L}$ where $\bar{L} << L$.

Find $H(X_i)$, $1 \leq i \leq N$.

Find $h_i^X$, $1 \leq i \leq N$ of length $\bar{L}$ such that $h_i^X(k)$ is the $l_k$-th element of $H(X_i)$ for $1 \leq k \leq \bar{L}$ and $\{l_1, l_2, \ldots, l_{\bar{L}}\}$ is a random subset of $\{1, 2, \ldots, L\}$.

For each j, $1 \leq j \leq M$, find frames $X_{j_k}$ such that $h_{jk}^X = h_j$, $1 \leq k \leq N_j$ for each j, $1 \leq j \leq M$. Here $N_j$ is the number of the places where the random binary vector $h_j$ matches the hash values of the input video.

For each $X_{j_k}$, compute the semi-global statistics, their quantized values and the corresponding sign vectors; randomly find the watermarking neighborhood widths such that there is no overlap between different neighborhoods (similar to portions of the encoding part of partially blind approach). Let $s_{j_k}$ be the sign vector for $X_{j_k}$ and $W_j$ be the watermarking neighborhood width for $X_{j_k}$ (same for all k for a particular j).

For frame $X_{j_k}+l_j$, embed the watermark $w_j$ by using the corresponding sign vector $s_{j_k}$ and the quantization step size $\Delta_j f(l_j/W_j)$, $-W_j \leq l_j \leq W_j$, $1 \leq k \leq N_j$ for each j, $1 \leq j \leq M$. Use QIM watermarking for watermark embedding. Here quantizer step sizes $\{\Delta_j\}$ are user entered positive parameters.

Watermark Decoding: Given the input video $\{Y_i\}$ of length $N_Y$, compute hash values $H(Y_i)$ for all i.

Find $h_i^Y$, $1 \leq i \leq N_Y$ of length $\bar{L}$ such that $h_i^Y(k)$ is the $l_k$-th element of $H(Y_i)$ for $1 \leq k \leq \bar{L}$ and $\{l_1, l_2, \ldots, l_{\bar{L}}\}$ is the same subset of $\{1, 2, \ldots L\}$ found in above in encoding.

For each j, $1 \leq j \leq M$, find frames $Y_{j_k}$ such that $h_{j_k}^Y = h_j$, $1 \leq \bar{k} \leq \bar{N}_j$, $1 \leq j \leq M$. Here $\bar{N}_j$ is the number of the places where the random binary vector $h_j$ matches the hash values of the input video.

For each frame $Y_{j_k}+l_j$, $-\alpha_j W_j \leq l_j \leq \alpha_j W_j$, $1 \leq \bar{k} \leq \bar{N}_j$, $1 \leq j \leq M$, carry out watermark decoding using QIM watermarking and employing $\Delta_j f(l_j/W_j)$ as the quantizer step size. Here $0 < \alpha_j \leq 1$ are user determined parameters. Let the decoded vectors be $\{w_{D,j_k,l_j}\}$.

Given $\{w_{D,j_k,l_j}\}$, find $\{w_{D,j}\}$ using the majority rule: $w_{D,j}(m)=1$ if $$\sum_{\bar{k}=1}^{\bar{N}_j} \sum_{l_j=-round(\alpha_j W_j)}^{round(\alpha_j W_j)} w_{D,j_k,l_j}(m) > \bar{N}_j \, round(\alpha_j W_j)$$

and 0 otherwise. Here round(.) denotes rounding to integer operation and $w_{D,j}$ is the resulting decoded vector that is derived from the neighborhood of $Y_{j_k}$ over all possible $\bar{k} \in \{1, 2, \ldots, \bar{N}_j\}$.

Declare that the watermark is present if $\max_j d(w_{D,j}, w_j) < T$; not present otherwise.

Decreasing Visual Artifacts

In both approaches, for a given center frame, the watermark are embedded in a neighborhood around it. This may be done using QIM watermarking. During this process, the sign vectors, that are derived from the center frame, may play a role in terms of decreasing visual artifacts. For a particular statistic, if one quantizes to a higher value for a given frame and if one quantizes to a lower value for a neighboring frame, there will be a slight "flickering effect." In order to minimize this effect, a fixed sign vector may be employed. That vector is used for the whole range of neighborhood.

Exemplary Computing System and Environment

FIG. 7 illustrates an example of a suitable computing environment 900 within which an exemplary video watermaker, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary video watermaker may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary video watermaker may be described in the general context of computer-executable instructions, such as program modules, being executed by a computer. Generally, program modules include routines, programs, objects, components, data structures, etc. that perform particular tasks or implement particular abstract data types. The exemplary video watermaker may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 7 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a signal obtainer, a region locator, a region definer, a region marker, a signal marker, a frame locator, a synchronizer, and a watermark detector.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary video watermaker may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 900 in which an exemplary video watermaker may be implemented. Specifically, the exemplary video watermaker(s) described herein may be implemented (wholly or in part) by any program modules 928–930 and/or operating system 926 in FIG. 7 or a portion thereof.

The operating environment is only an example of a suitable operating environment and is not intended to suggest any limitation as to the scope or use of functionality of the exemplary video watermaker(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary video watermaker may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the invention.

What is claimed is:

1. A method for facilitating the protection of a video signal, the method comprising:

generating one or more frames of a subject video signal to produce a representative identification ("rep_id") for such frames, wherein a rep_id of a frame is based upon inherent characteristics of such frame;

comparing the representative identification for the frames to a set of one or more expected rep_ids;

selecting one or more detection frames of the subject video signal, wherein the generated rep_id of a detection frame substantially correspond to the an expected rep_id of the set.

2. A method as recited in claim 1 further comprising:

examining the one or more detection frames;

determining whether a watermark is present based upon such examining and without access to a known pristine specimen of the video signal.

3. A method as recited in claim 1 further comprising:

examining the one or more detection frames;

determining whether a watermark is present based upon such examining.

4. A method as recited in claim 1 further comprising:

examining the one or more detection frames and frames surrounding one or more detection frames;

determining whether a watermark is present based upon such examining.

5. A method as recited in claim 1, wherein the rep_id of a frame comprise a hash value of the frames.

6. A method as recited in claim 1, wherein the set of one or more expected rep_ids comprise a hash value of frame of an original signal within which a watermark is embedded.

7. A computer comprising one or more computer-readable media having computer-executable instructions that, when executed by the computer, perform a method as recited in claim 1.

8. One or more computer-readable media having computer-executable instructions that, when executed by a computer, performs the acts comprising:

generating one or more frames of a subject video signal to produce a representative identification ("rep_id") for such frames, wherein a rep_id of a frame is based upon inherent characteristics of such frame;

comparing the representative identification for the frames to a set of one or more expected rep_ids;

selecting one or more detection frames of the subject video signal, wherein the generated rep_id of a detection frame substantially correspond to the an expected rep_id of the set.

9. A watermark detecting system, the system comprising:

a video signal obtainer configured to obtain a subject video signal;

a frame locator configured to:
  generate one or more frames of the subject video signal to produce a representative identification ("rep_id") for such frames, wherein a rep_id of a frame is based upon inherent characteristics of such frame;
  compare the representative identification for the frames to a set of one or more expected rep_ids;
  select one or more detection frames of the subject video signal, wherein the generated rep_id of a detection frame substantially correspond to the an expected rep_id of the set;

a watermark detector configured to:
  examine the one or more detection frames;
  determine whether a watermark is present based upon such examining and without access to a known pristine specimen of the video signal.

* * * * *